United States Patent
Joo et al.

(10) Patent No.: US 10,649,303 B2
(45) Date of Patent: May 12, 2020

(54) OPTICAL DEVICE AND OPTICAL SYSTEM INCLUDING THE SAME

(71) Applicants: SAMSUNG ELECTRONICS CO., LTD., Suwon-si (KR); The Board of Trustees of the Leland Stanford Junior University, Stanford, CA (US)

(72) Inventors: Wonjae Joo, Seongnam-si (KR); Mark L. Brongersma, Stanford, CA (US); Juhyung Kang, Stanford, CA (US)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 13 days.

(21) Appl. No.: 15/965,369

(22) Filed: Apr. 27, 2018

(65) Prior Publication Data

US 2018/0314130 A1 Nov. 1, 2018

Related U.S. Application Data

(60) Provisional application No. 62/491,548, filed on Apr. 28, 2017.

(30) Foreign Application Priority Data

Jul. 24, 2017 (KR) .................. 10-2017-0093686

(51) Int. Cl.
*G02F 1/29* (2006.01)
*G02F 1/01* (2006.01)

(52) U.S. Cl.
CPC .............. *G02F 1/29* (2013.01); *G02F 1/0102* (2013.01); *G02F 2201/34* (2013.01);
(Continued)

(58) Field of Classification Search
CPC . G02F 1/0123; G02F 1/0121; G02B 26/0841; G02B 26/0833; H04B 10/50575
(Continued)

(56) References Cited

U.S. PATENT DOCUMENTS 8,830,556 B2   9/2014   Smith et al.
9,419,583 B2   8/2016   Rinaldi et al.
(Continued)

OTHER PUBLICATIONS

M. Mavridou et al., "A New Class of Tunable Multi-layer Meta-Surfaces", 8th International Congress on Advanced Electromagnetic Materials in Microwaves and Optics—Metamaterials 2014, IEEE, Aug. 25-30, 2014, pp. 199-201.
(Continued)

*Primary Examiner* — Mohammed A Hasan
(74) *Attorney, Agent, or Firm* — Sughrue Mion, PLLC

(57) ABSTRACT

An optical device and an optical system including the optical device are provided. The optical device may include a reflective layer and a plurality of nano-beams spaced apart from the reflective layer. The plurality of nano-beams may be formed as a metasurface. The nano-beams may have a pattern structure having a plurality of metasurface forms, and the distance of the gaps between the plurality of nano-beams and the reflective layer may be adjustable individually or as a whole. The optical device may be a beam steering device or an optical phase modulator.

10 Claims, 5 Drawing Sheets

(52) U.S. Cl.
CPC ...... *G02F 2202/30* (2013.01); *G02F 2203/24* (2013.01); *G02F 2203/50* (2013.01)

(58) Field of Classification Search
USPC .......................................................... 359/239
See application file for complete search history.

(56) References Cited

U.S. PATENT DOCUMENTS

| | | | |
|---|---|---|---|
| 2015/0286340 A1* | 10/2015 | Send | G01S 17/46 345/175 |
| 2016/0099701 A1 | 4/2016 | Rinaldi et al. | |
| 2016/0109699 A1* | 4/2016 | Margallo Balbas | G02B 26/103 359/201.2 |
| 2016/0196943 A1 | 7/2016 | Jarrahi et al. | |
| 2017/0153528 A1* | 6/2017 | Kim | G02F 1/293 |
| 2018/0175163 A1* | 6/2018 | Barraud | H01L 29/78654 |

OTHER PUBLICATIONS

Yifei Mao et al., "Multi-Direction-Tunable Three-Dimensional Meta-Atoms for Reversible Switching between Midwave and Long-Wave Infrared Regimes", Nano Letters, American Chemical Society, 2016, pp. 7025-7029.

Imogen M. Pryce et al., "Highly Strained Compliant Optical Metamaterials with Large Frequency Tunability", Nano Letters, American Chemical Society, 2010, pp. 4222-4227.

B. S. Dennis et al., "Ultracompact Nano-Mechanical Plasmonic Phase Modulators", National Photonics, 2014, 30 pages.

Jun-Yu Ou et al., "An electromechanically reconfigurable plasmonic metamaterial operating in the near-infrared", Nature Nanotechnology, Macmillan Publishers Limited, vol. 8, Apr. 2013, 6 pages (published online Mar. 17, 2013).

Joao Valente et al., "A magneto-electro-optical effect in a plasmonic nanowire material", Nature Communications, Macmillan Publishers Limited, Apr. 24, 2015, pp. 1-6.

* cited by examiner

OPTICAL DEVICE AND OPTICAL SYSTEM INCLUDING THE SAME

CROSS-REFERENCE TO RELATED APPLICATIONS

This application claims priority from U.S. Patent Provisional Application No. 62/491,548, filed on Apr. 28, 2017 in the USPTO, and Korean Patent Application No. 10-2017-0093686, filed on Jul. 24, 2017 in the Korean Intellectual Property Office, the disclosures of which are incorporated herein in their entireties by reference.

BACKGROUND

1. Field

Apparatuses and methods consistent with example embodiments relate to an optical device and an optical system including the optical device.

2. Description of the Related Art

In order to steer a beam such as a laser to a desired target, various methods have been used. For example, a method of mechanically rotating a laser-irradiated portion has been used, as well as a method of using interference of a laser beam bundle in the form of several pixels or waveguides.

When these methods are used, a pixel or waveguide shape may be controlled electrically or thermally, and thereby a beam such as a laser may be steered.

SUMMARY

Provided is an optical device having a structure, which includes a reflective layer and a plurality of nano-beams having a metasurface structure.

Provided is an optical system including the optical device.

Additional aspects will be set forth in part in the description which follows and, in part, will be apparent from the description, or may be learned by practice of the presented embodiments.

According to an aspect of an example embodiment, an optical device may include: a reflective layer; and a plurality of nano-beams spaced apart from the reflective layer, the plurality of nano-beams being formed as a metasurface. A distance of a gap between the reflective layer and each of the plurality of nano-beams may be adjustable.

The reflective layer and each of the plurality of nano-beams may be spaced apart from each other and maintained in a non-contact state with respect to each other.

The plurality of nano-beams may include a first nano-beam and a second nano-beam. A first gap between the first nano-beam and the reflective layer may be equal in distance to a second gap between the second nano-beam and the reflective layer.

The optical device may be an optical phase modulator in which one of an amplitude and a phase of a beam incident from an external light source is modulated.

The plurality of nano-beams may include a first nano-beam and a second nano-beam. A first gap between the first nano-beam and the reflective layer may be different in distance from a second gap between the second nano-beam and the reflective layer.

The optical device may be a beam steering device.

The reflective layer may be disposed on a substrate and the optical device may further include a dielectric layer disposed on the reflective layer. Each of the plurality of nano-beams may be spaced apart from the dielectric layer and a distance of a gap between the dielectric layer and each of the plurality of nano-beams may be adjustable.

A thickness of the dielectric layer may range from several nanometers to several tens of nanometers.

The optical device may further include: a bottom contact layer disposed on a substrate; a spacer layer disposed on the bottom contact layer; and a dielectric layer disposed on the reflective layer, the reflective layer being disposed on the spacer layer. Each of the plurality of nano-beams may be spaced apart from the dielectric layer and a distance of a gap between the dielectric layer and each of the plurality of nano-beams may be adjustable.

According to an aspect of an example embodiment, an optical system may include: the optical device described above; a light source configured to irradiate light to the optical device; a detector configured to detect at least one of a modulated beam and a steered beam from the optical device; and a driving circuit configured to control at least one of the optical device and the detector.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
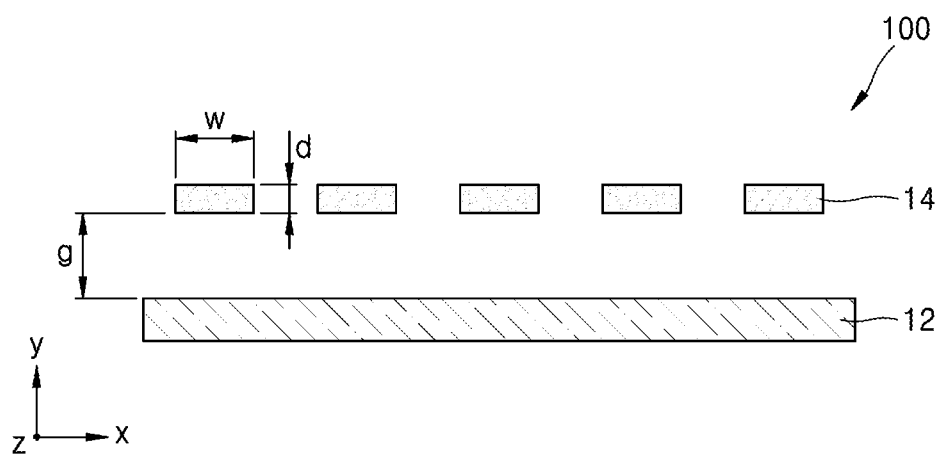
FIG. 1 is a cross-sectional view schematically illustrating an optical device according to an example embodiment.

Reference will now be made in detail to example embodiments, which are illustrated in the accompanying drawings, wherein like reference numerals refer to like elements throughout and sizes of elements in the drawings may be exaggerated for convenience of explanation. In this regard, the present example embodiments may have different forms and should not be construed as being limited to the descriptions set forth herein. Accordingly, the example embodiments are merely described below, by referring to the figures, to explain aspects.

It will be understood that when a layer, region, or element is referred to as being "formed on" another layer, region, or element, it can be directly or indirectly formed on the other layer, region, or element. That is, for example, intervening layers, regions, or elements may be present. Expressions such as "at least one of," when preceding a list of elements, modify the entire list of elements and do not modify the individual elements of the list.

FIG. 1 is a cross-sectional view schematically illustrating an optical device 100 according to an example embodiment.

Referring to FIG. 1, the optical device 100 according to an example embodiment may include a reflective layer 12 and a nano-beam 14 spaced apart from the reflective layer 12. The reflective layer 12 and the nano-beam 14 are spaced apart from each other and a predetermined gap may be maintained therebetween.

The reflective layer 12 may have a thickness of several tens to several hundreds of nanometers. The reflective layer 12 may include a metal, an alloy, or other highly reflective material. For example, the reflective layer 12 may include Ag, Au, Al, Pt, an alloy including at least one thereof, TiN, TaN, or the like.

The nano-beam 14 formed over the reflective layer 12 includes a plurality of pattern structures, and may have a form of a metasurface. The metasurface may refer to a structure in which a distance between patterns (e.g., a gap between adjacent nano-beams) is less than half of the wavelength of incident light. The nano-beam 14 may include a metal, an alloy, or the like. Specifically, for example, the nano-beam 14 may include a metal, such as Ag, Au, Al, Pt, or an alloy of at least one thereof, or may include a metal nitride such as TiN or TaN.

The reflective layer 12 and the nano-beam 14 may be kept apart from each other and not in contact with each other. A gap g between the reflective layer 12 and the nano-beam 14 may be maintained at a distance between approximately 1 nm and 100 nm. In addition, a material having elasticity may be inserted as a gap filling material in the gap g between the reflective layer 12 and the nano-beam 14. For example, polydimethylsiloxane (PDMS) and the like may be used as the gap filling material.

A width w of each of nano-beams included in the nano-beam 14 may be about 100 nm to about 500 nm. The nano-beam may have a periodicity of about 200 nm to about 1000 nm with respect to the nano-beams included therein. A thickness d of the nano-beam 14 is not limited thereto.

Figure 2:
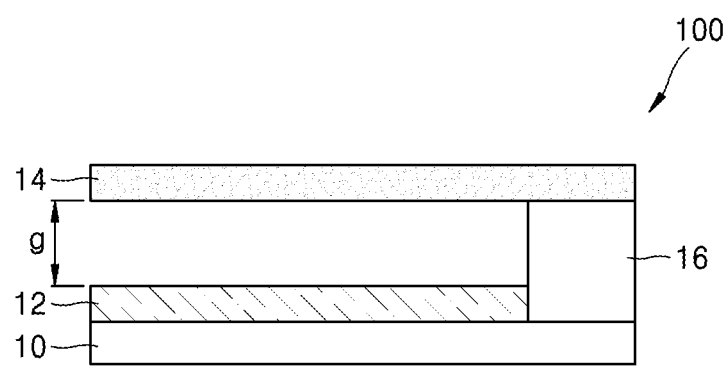
FIG. 2 is a side cross-sectional view schematically illustrating an optical device according to an example embodiment.

FIG. 2 is a side cross-sectional view schematically illustrating an optical device 100 according to an example embodiment.

Referring to FIG. 2, the reflective layer 12 may be formed on a substrate 10, and a support 16 may be formed on a side of the reflective layer 12. A nano-beam 14 extending parallel to the reflective layer 12 may be formed on the support 16. As shown in FIG. 1, the nano-beam 14 may be provided as a plurality of nano-beams formed on the support 16, and the thickness and width of the nano-beams may be selectively controlled.

Figure 3:
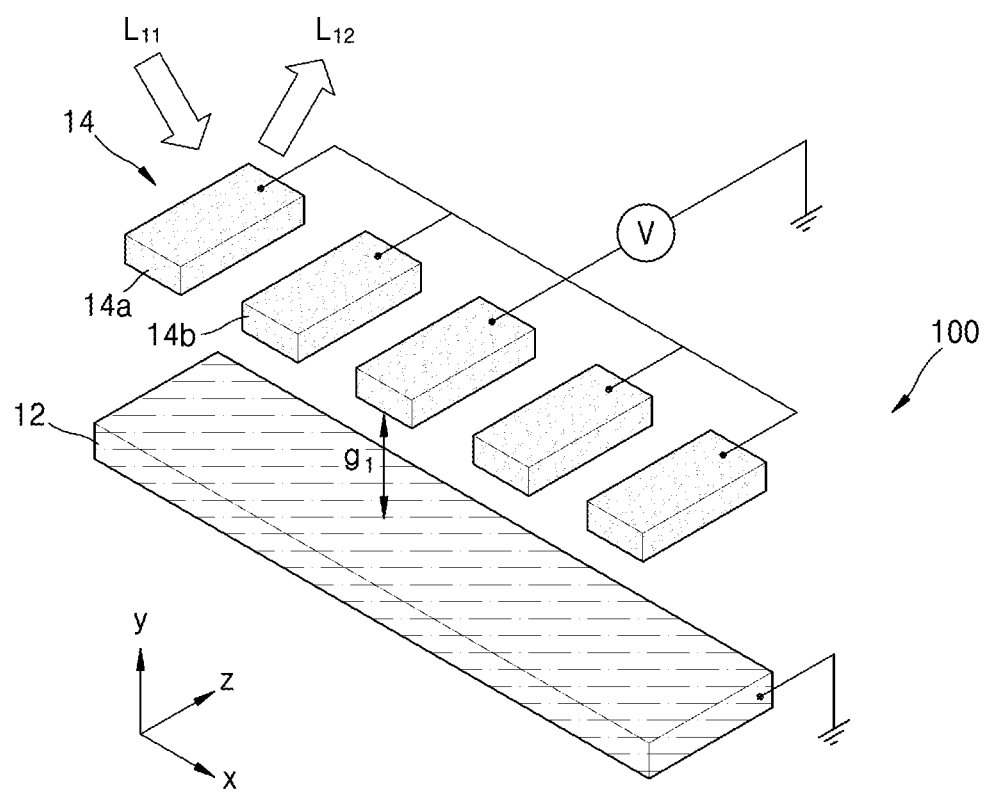
FIG. 3 is a diagram illustrating an example embodiment in which an optical device operates as an optical modulator while a gap between a reflective layer and a nano-beam of the optical device is kept constant.

FIG. 3 is a diagram illustrating an example embodiment in which an optical device 100 operates as an optical modulator while a gap between the reflective layer 12 and the nano-beam 14 of the optical device 100 is kept constant.

Referring to FIG. 3, the nano-beam 14 spaced apart from the reflective layer 12 may include a plurality of individual nano-beams 14a, 14b and the like, and gaps g1 between the individual nano-beams 14a, 14b and the like and the reflective layer 12 may be kept constant. In this case, as the gaps g1 between the individual nano-beams 14a, 14b and the like and the reflective layer 12 are kept constant, an amplitude or a phase of a beam L11 incident from a light source may be modulated. When the gaps g1 between the reflective layer 12 and the plurality of individual nano-beams 14a, 14b and the like are kept constant, the optical device 100 may be used as an optical phase modulator.

Figure 4:
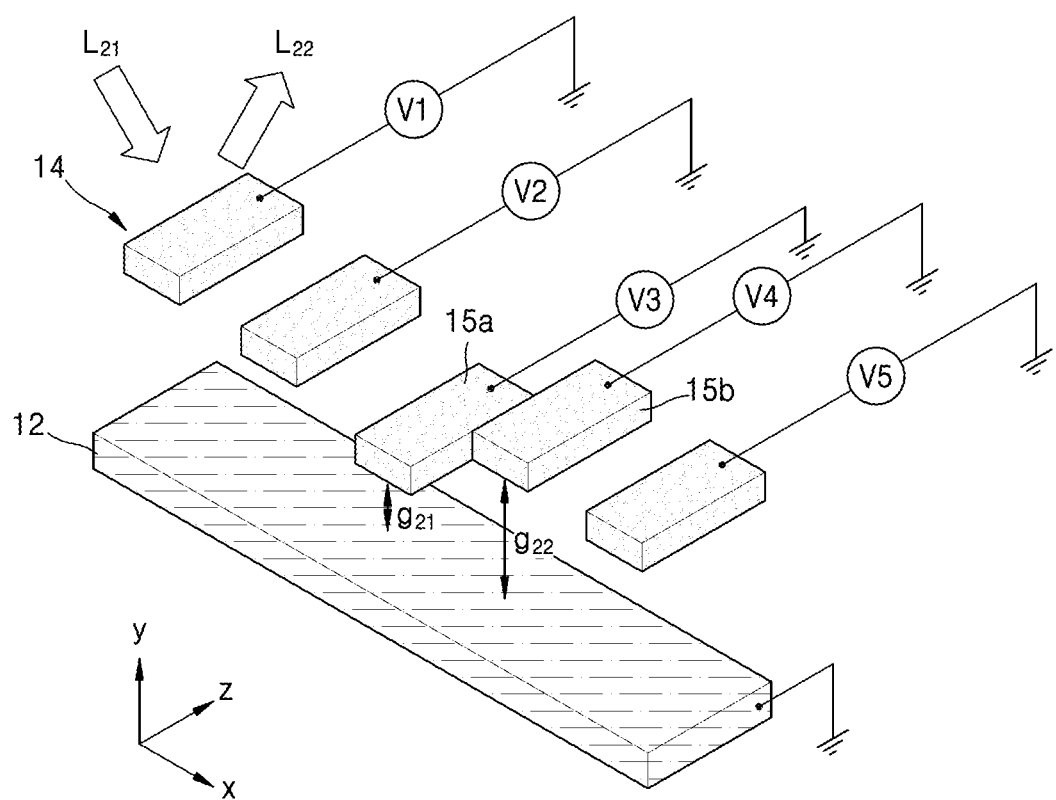
FIG. 4 is a diagram illustrating an example embodiment in which an optical device operates as a beam steering device while a gap between a reflective layer and a nano-beam of the optical device varies according to a nano-beam.

FIG. 4 is a diagram illustrating an example embodiment in which an optical device 100 operates as a beam steering device while a gap between the reflective layer 12 and the nano-beam 14 of the optical device 100 varies according to each of nano-beams thereof.

Referring to FIG. 4, the nano-beam 14 may include a plurality of individual nano-beams 15a, 15b and the like, and gaps between the individual nano-beams 15a, 15b and the like and the reflective layer 12 may be maintained independently of each other. When the gaps between the individual nano-beams 15a, 15b and the like and the reflective layer 12 are maintained independently of each other, the optical device 100 may be used as a beam steering device.

As shown in FIGS. 1 to 4, the gap g between the nano-beam 14 and the reflective layer 12, the gaps between the individual nano-beams 14a, 14b and the like and the reflective layer 12, and the gaps between the individual nano-beams 15a, 15b and the like and the reflective layer 12 may be controlled identically or independently. Specifically, for example, an electric Coulomb force or a ferroelectric actuator may be used to control the gaps.

For example, when the electric Coulomb force is used, a lower metal reflective layer is used as a common ground electrode. In this case, when a voltage is applied to each nano-beam, a capacitor structure is formed, and charges are gathered in the nano-beams and the reflective layer, and a mutual attractive force (Coulomb force) is generated between the nano-beams and the reflective layer. Each nano-beam may have a free-standing structure to allow vertical movement by the Coulomb force.

As another example, when the ferroelectric actuator is used, a material capable of expanding/contracting in a longitudinal direction according to an applied voltage may be used in the ferroelectric actuator. In this case, the ferroelectric actuator may be designed to be connected to a support at both ends of a nano-beam to allow vertical movement of the nano-beam.

In the two examples described above, the center of the nano-beam may be fabricated so as to float in the air.

Figure 5:
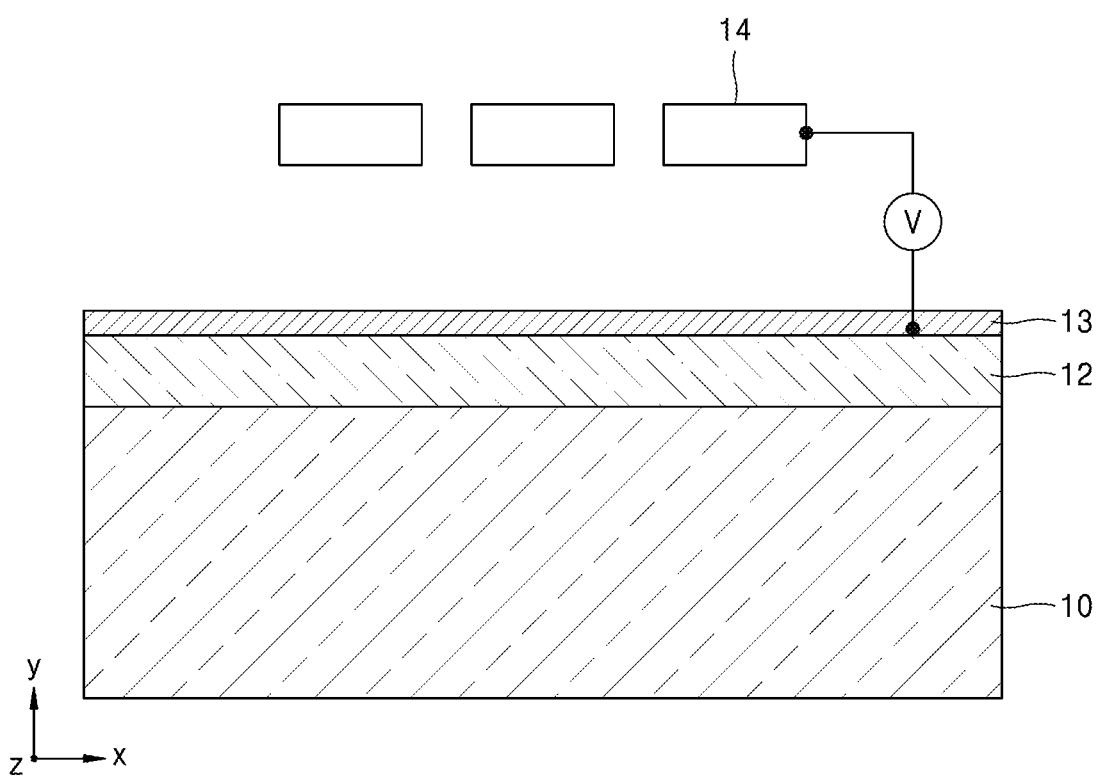
FIG. 5 is a cross-sectional view of an optical device driven in an electro-static manner, according to an example embodiment.

FIG. 5 is a cross-sectional view of an optical device driven in an electro-static manner, according to an example embodiment.

Referring to FIG. 5, the optical device according to the example embodiment may include the reflective layer 12 formed on the substrate 10, a dielectric layer 13 formed on the reflective layer 12, and the nano-beam 14 formed apart from the dielectric layer 13. The substrate 10 may be used without restriction as long as the substrate 10 includes a substrate material used in general electronic devices. The substrate 10 may be a quartz, silicon, silicon oxide, silicon nitride, or sapphire substrate. The reflective layer 12 may include a metal, an alloy, or other highly reflective material. For example, the reflective layer 12 may include Ag, Au, Al, Pt, an alloy including at least one thereof, TiN, TaN, or the like. The reflective layer 12 may also serve as a lower contact layer.

The dielectric layer 13 formed on the reflective layer 12 may have a thickness of approximately several to several tens of nanometers. The dielectric layer 13 may include a dielectric material, for example, silicon oxide, silicon nitride, aluminum oxide, hafnium oxide, or the like. When a distance between the reflective layer 12 and the nano-beam 14 approaches 10 nanometers or less, the reflective layer 12 and the nano-beam 14 may be electrically connected to each other. The dielectric layer 13 may prevent the reflective layer 12 and the nano-beam 14 from being electrically connected to each other.

Figure 6:
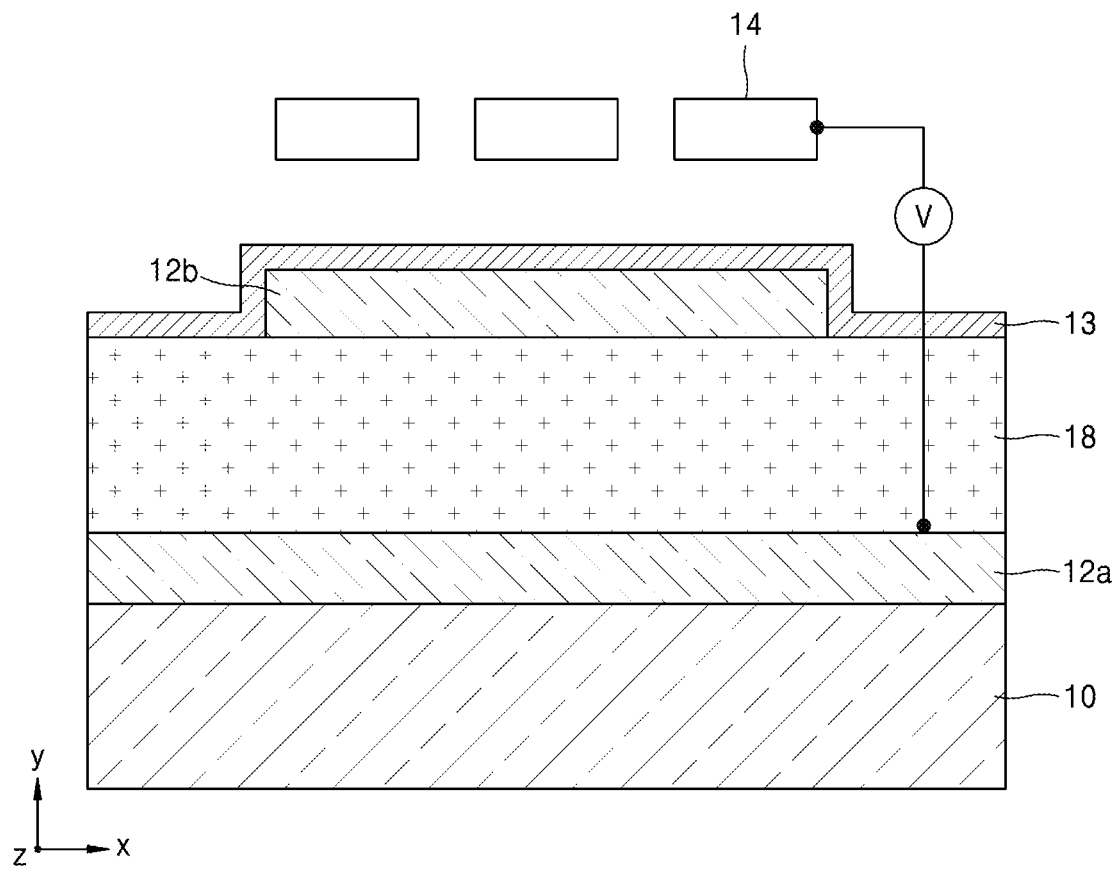
FIG. 6 is a cross-sectional view of an optical device driven in an electro-static manner, according to a modification.

FIG. 6 is a cross-sectional view of an optical device driven in an electro-static manner, according to a modification.

Referring to FIG. 6, the optical device according to the modification may include a bottom contact layer 12a formed on the substrate 10, a spacer layer 18 formed on the bottom contact layer 12a, and a reflective layer 12b formed on the spacer layer 18. The dielectric layer 13 may be formed on the spacer layer 18 and the reflective layer 12b. The optical device may further include the nano-beam 14 formed to be spaced apart from the reflective layer 12b and the dielectric layer 13. Although the reflective layer 12 in FIG. 5 is shown as being able to serve as a bottom contact, a separate bottom contact layer 12a may be formed in FIG. 6. The spacer layer 18 may be formed between the bottom contact layer 12a and the reflective layer 12b, and the spacer layer 18 may include an insulating material. The spacer layer 18 may include, for example, silicon carbide, silicon nitride, aluminum oxide, tungsten oxide, or hafnium oxide.

In the optical device of FIG. 5, a bias voltage is applied to the nano-beam 14 and the reflective layer 12, and serves to determine optical characteristics.

On the other hand, in the optical device of FIG. 6, electrical characteristics may be determined by the nano-beam 14 and the bottom contact layer 12a, and the distance of a gap for determining optical characteristics may be determined by the nano-beam 14 and the reflective layer 12b. Since the Coulomb force is inversely proportional to the square of a distance, when an offset distance is long, a slight change in the Coulomb force occurs with respect to the applied voltage. Thus, the optical device of FIG. 6 may be capable of fine control.

Figure 7:
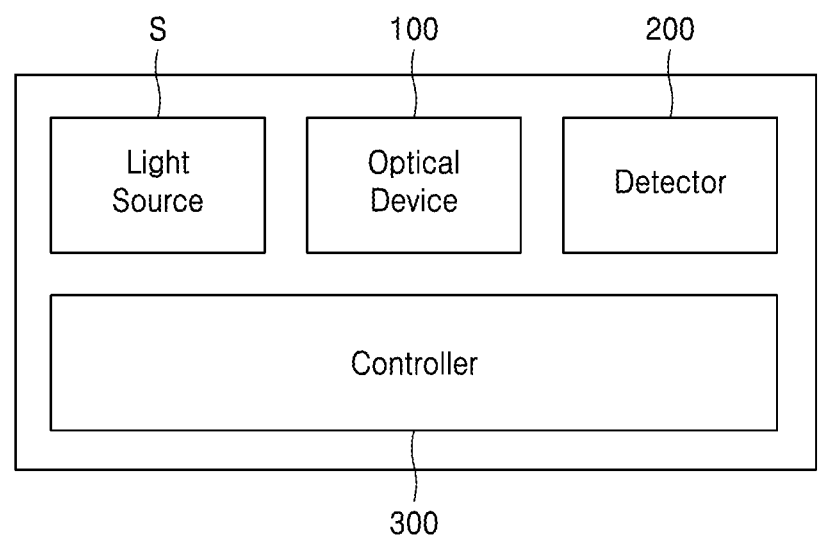
FIG. 7 is a block diagram of an optical system including an optical device, according to an example embodiment.

FIG. 7 is a diagram of an optical system including an optical device, according to an example embodiment.

Referring to FIG. 7, the optical system including an optical device 100, according to an example embodiment, may include a light source S for irradiating light such as visible light or infrared light to the optical device 100, and a detector 200 for detecting a beam modulated or steered by the optical device 100. In addition, the optical system may include a controller 300 (i.e., a driving circuit) that may control the optical device 100, the light source S, and the detector 200 individually. The optical system including the optical device 100 may be used as, for example, a solid state meta LiDAR system that optically steers a beam and recognizes a surrounding object scanned by the steered beam.

As described above, according to the present disclosure, an optical device, which includes a reflective layer and a plurality of nano-beams spaced apart from the reflective layer and may modulate antenna characteristics of a meta-surface structure by adjusting gaps between the nano-beams and the reflective layer, is provided.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:
1. An optical device comprising:
a reflective layer; and
a plurality of nano-beams spaced apart from the reflective layer, the plurality of nano-beams being formed as a metasurface,
wherein a distance of a gap between the reflective layer and each of the plurality of nano-beams is adjustable.
2. The optical device of claim 1, wherein the reflective layer and each of the plurality of nano-beams are spaced apart from each other and maintained in a non-contact state with respect to each other.
3. The optical device of claim 2, wherein the plurality of nano-beams comprise a first nano-beam and a second nano-beam, and
wherein a first gap between the first nano-beam and the reflective layer is equal in distance to a second gap between the second nano-beam and the reflective layer.
4. The optical device of claim 3, wherein the optical device is an optical phase modulator in which one of an amplitude and a phase of a beam incident from an external light source is modulated.
5. The optical device of claim 2, wherein the plurality of nano-beams comprise a first nano-beam and a second nano-beam, and
wherein a first gap between the first nano-beam and the reflective layer is different in distance from a second gap between the second nano-beam and the reflective layer.
6. The optical device of claim 5, wherein the optical device is a beam steering device.
7. The optical device of claim 1, wherein the reflective layer is disposed on a substrate and the optical device further comprises a dielectric layer disposed on the reflective layer, and
wherein each of the plurality of nano-beams is spaced apart from the dielectric layer and a distance of a gap between the dielectric layer and each of the plurality of nano-beams is adjustable.
8. The optical device of claim 7, wherein a thickness of the dielectric layer ranges from several nanometers to several tens of nanometers.
9. The optical device of claim 1, further comprising:
a bottom contact layer disposed on a substrate;
a spacer layer disposed on the bottom contact layer; and
a dielectric layer disposed on the reflective layer, the reflective layer being disposed on the spacer layer,
wherein each of the plurality of nano-beams is spaced apart from the dielectric layer and a distance of a gap between the dielectric layer and each of the plurality of nano-beams is adjustable.
10. An optical system comprising:
an optical device comprising:
a reflective layer, and
a plurality of nano-beams spaced apart from the reflective layer, the plurality of nano-beams being formed as a metasurface, wherein a distance of a gap between the reflective layer and each of the plurality of nano-beams is adjustable;
a light source configured to irradiate light to the optical device;
a detector configured to detect at least one of a modulated beam and a steered beam from the optical device; and
a driving circuit configured to control at least one of the optical device and the detector.

* * * * *